(12) United States Patent
Geis-Esser et al.

(10) Patent No.: US 11,686,353 B2
(45) Date of Patent: Jun. 27, 2023

(54) ACTUATION MECHANISM, IN PARTICULAR FOR A CLUTCH ACTUATOR

(71) Applicant: KNORR-BREMSE Systeme fuer Nutzfahrzeuge GmbH, Munich (DE)

(72) Inventors: Daniel Geis-Esser, Munich (DE); Juergen Schudy, Munich (DE); Alexander Koch, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 166 days.

(21) Appl. No.: 17/272,488

(22) PCT Filed: Jul. 29, 2019

(86) PCT No.: PCT/EP2019/070346
§ 371 (c)(1),
(2) Date: Mar. 1, 2021

(87) PCT Pub. No.: WO2020/043410
PCT Pub. Date: Mar. 5, 2020

(65) Prior Publication Data
US 2021/0324918 A1    Oct. 21, 2021

(30) Foreign Application Priority Data
Aug. 31, 2018   (DE) .................... 10 2018 214 884.8

(51) Int. Cl.
*F16D 23/14*   (2006.01)
*F16D 25/12*   (2006.01)
*F16D 13/75*   (2006.01)

(52) U.S. Cl.
CPC ........... *F16D 23/14* (2013.01); *F16D 13/755* (2013.01); *F16D 25/126* (2013.01)

(58) Field of Classification Search
CPC ...... F16D 13/75; F16D 13/752; F16D 13/755; F16D 23/12; F16D 23/14; F16D 25/126
(Continued)

(56) References Cited

U.S. PATENT DOCUMENTS 3,286,803 A * 11/1966 Zeidler .................. F16D 23/12
                                              403/368
3,478,853 A * 11/1969 Kraeplin ............... F16D 13/755
                                              192/77

(Continued)

FOREIGN PATENT DOCUMENTS

CN   10103376 A   9/2007
CN   105723111 A   6/2016
(Continued)

OTHER PUBLICATIONS

International Preliminary Report on Patentability (PCT/IB/326 & PCT/IB/373) issued in PCT Application No. PCT/EP2019/070346 dated Mar. 11, 2021, including English translation of document C2 (German-language Written Opinion (PCT/ISA/237), filed on Mar. 1, 2021) (eight (8) pages).

(Continued)

*Primary Examiner* — Richard M Lorence
(74) *Attorney, Agent, or Firm* — Crowell & Moring LLP

(57) ABSTRACT

An actuation mechanism for a clutch, includes: an actuation element designed to be applied with an actuating force and to be shifted in an actuation direction by same; a transfer element designed to carry out a shift in the actuation direction; and a compensation mechanism designed to apply a reinforcing clamping force for the frictionally engaged transfer of the actuating force between the transfer element and the actuation element, when an actuating force is applied to the actuation element. The compensation mechanism has a friction element and a counter surface which are designed to bring about the reinforcing clamping force via a frictional (Continued)

connection when applying the actuating force. The friction element and the counter surface are designed to generate the reinforcing clamping force via a supporting force resulting from a deflection of the actuating force. The reinforcing clamping force has at least the value of the supporting force.

16 Claims, 2 Drawing Sheets

(58) Field of Classification Search
USPC .............................. 192/85.62, 111.12, 111.14
See application file for complete search history.

(56) References Cited

U.S. PATENT DOCUMENTS

| | | | |
|---|---|---|---|
| 4,399,898 A | | 8/1983 | Olschewski et al. |
| 4,405,041 A | | 9/1983 | Broadbent |
| 5,984,072 A | | 11/1999 | Leimbach et al. |
| 6,085,884 A | * | 7/2000 | Seufert ................. F16D 25/126 |
| | | | 92/13 |

FOREIGN PATENT DOCUMENTS

| | | |
|---|---|---|
| DE | 29 44 648 A1 | 5/1981 |
| DE | 31 13 463 A1 | 12/1982 |
| DE | 34 14 834 A1 | 10/1985 |
| DE | 40 37 683 A1 | 6/1992 |
| DE | 42 43 849 A1 | 6/1994 |
| FR | 393 422 A | 12/1908 |
| JP | 6-257621 A | 9/1994 |
| JP | 10-119603 A | 5/1998 |
| SU | 1208357 A | 1/1986 |

OTHER PUBLICATIONS

Japanese-language Office Action issued in Japanese Application No. 2021-510779 dated May 23, 2022 with English translation (10 pages).

Chinese-language Office Action issued in Chinese Application No. 201980056507.X dated Feb. 28, 2022 with partial English translation (10 pages).

International Search Report (PCT/ISA/210) issued in PCT Application No. PCT/EP2019/070346 dated Nov. 12, 2019 with English translation (five (5) pages).

\* cited by examiner

ACTUATION MECHANISM, IN PARTICULAR FOR A CLUTCH ACTUATOR

BACKGROUND AND SUMMARY OF THE INVENTION

The invention relates to an actuation mechanism for the conversion of an actuation force into a displacement of a transmission element. Furthermore, the invention relates to a clutch actuator which has an actuation mechanism of this type.

Actuation mechanisms convert an actuation force which is applied to an actuation element into a displacement of a transmission element, in order, for example, to disengage a clutch by the displacement being introduced into the clutch. Other technical apparatuses can also be actuated by means of an actuation mechanism of this type, however.

Furthermore, however, relative movements between the actuation element and the transmission element have to be permitted under certain conditions, in order, for example, to compensate for wear of the technical apparatus, in particular of friction linings of the clutch, as a result of which idle travels which would have to be overcome in the case of the actuation are avoided. Here, in the case of actuation, the connection between the actuation element and the transmission element must be configured reliably against slipping, in order to avoid, in particular, safety-critical situations, such as, for example, the undesired engaging of a clutch.

It is therefore an object of the present invention to provide an actuation mechanism of the above-described type and a clutch actuator which solve at least one of the abovementioned problems.

This object is achieved by way of the subjects of the independent claims. Advantageous developments are the subject matter of the subclaims.

According to the invention, an actuation mechanism for a clutch is provided, having:

- an actuation element which is configured to be loaded with an actuation force and to be displaced by way of the latter in an actuation direction,
- a transmission element which is configured to carry out a displacement in the actuation direction, and
- a compensation mechanism which is configured to apply a reinforcing pressing force for the frictionally locking transmission of the actuation force between the transmission element and the actuation element when an actuation force is applied to the actuation element, the compensation mechanism having a friction element and a counter-face which are configured to configure the reinforcing pressing force by way of a frictionally locking connection in the case of the application of the actuation force, and the friction element and the counter-face being configured to bring about the reinforcing pressing force by way of a supporting force which results from a deflection of the actuation force, the reinforcing pressing force having at least the magnitude of the supporting force.

The reinforcing pressing force is particularly preferably greater than the supporting force.

The friction element and the counter-face are preferably arranged in such a way that they do not support the supporting force in the direction of action of the supporting force. This means that a very high reinforcing pressing force has to be configured, in order to produce a force component which counteracts the supporting force in the direction of action of the latter.

A perpendicular with respect to the counter-face is preferably not parallel to the direction of action of the supporting force.

Here, the friction element and the counter-face are configured in such a way that they are pressed against one another by way of the supporting force.

The compensation mechanism is preferably configured to reduce the reinforcing pressing force between the transmission element and the actuation element when no actuation force is applied to the actuation element, and/or when the actuation element is situated in an end position. If the actuation force is reduced or withdrawn completely, the frictionally locking connection between the friction element and the counter-face is released again. As a result, jamming of the friction element is prevented.

As an alternative or in addition, the friction element and the counter-face are configured to permit a relative movement of the transmission element with respect to the actuation element parallel to the actuation direction when no actuation force is applied to the actuation element and/or when the actuation element is situated in the end position. The relative movement achieves a situation where a length compensation can take place between the transmission element and the actuation element, which length compensation can compensate, for example, for the wear in a clutch.

The counter-face is preferably configured as a face of a groove which extends along the actuation direction, and the friction element is preferably configured as a tongue which is configured to be guided in the groove along the actuation direction. Here, the friction element and the groove represent a tongue and groove connection.

The groove is preferably configured as a groove which tapers transversely with respect to the actuation direction, the counter-face and particularly preferably a further counter-face which extends along the actuation direction configuring the tapered portion. This makes an introduction of the friction element into the groove parallel, preferably perpendicularly, with respect to the actuation direction possible, the frictionally locking connection being configured between the friction element and the counter-face/counter-faces.

The counter-face/counter-faces preferably extends/extend along the actuation direction, a positively locking connection in the form of stops, latches, etc. not being provided between the friction element and the counter-face/counter-faces parallel to the actuation direction. The transmission of the actuation force in the actuation direction preferably takes place exclusively via friction.

If the friction element and the counter-face/counter-faces are moved toward one another transversely, preferably perpendicularly, with respect to the actuation direction, they are preferably configured to come into contact with one another and to configure a frictionally locking connection. The counter-face/counter-faces is/are therefore preferably not oriented transversely, preferably perpendicularly, with respect to the actuation direction, parallel to the movement direction of the friction element.

The compensation mechanism preferably has a clamping element which is configured for the deflection of the actuation force into the supporting force, the magnitude of the supporting force proportionally to the magnitude of the actuation force preferably being higher. Thus, a preferably higher supporting force which brings the friction element into contact with the counter-faces can advantageously be formed from an actuation force.

A plurality of clamping elements are preferably provided which further preferably are arranged in a rotationally symmetrical manner with respect to the actuation direction. The clamping elements can further preferably be arranged at identical angular spacings.

As an alternative or in addition, the compensation mechanism is configured to reduce the reinforcing pressing force, in particular, to zero. As a result, a relative movement between the transmission element and the actuation element is advantageously permitted, without the latter two being impeded in the relative movement by way of mutual friction, in particular between the friction element and the counter-face/counter-faces. As a result, for example, a compensation or adjustment of the transmission element with respect to an apparatus to be actuated, such as a clutch, can take place. There is therefore the possibility of compensating for idle travels which would be produced, for example, by way of wear of the clutch linings.

The clamping element is preferably configured in one piece with the actuation element. This can therefore achieve a situation where the clamping element can be deflected elastically by way of an elastic configuration of the connection between the clamping element and the actuation element.

As an alternative, the clamping element is connected to the actuation element via an articulated connection, preferably a torque-free articulated connection. A torque-free articulated connection is configured to transmit merely forces between the clamping element and the actuation element.

The friction element is preferably provided on the actuation element or the clamping element, and the counter-face is preferably provided on the transmission element, or the friction element is provided on the transmission element, and the counter-face is provided on the actuation element or the clamping element.

Friction elements or counter-faces are preferably provided on a plurality of clamping elements.

A tensioning element is preferably provided between the actuation element and the transmission element, which tensioning element is configured, for the transmission of the actuation force to the transmission element, to generate a tensioning pressing force which is configured in such a way that it increases the maximum transmissible actuation force (=maximum actuation force), the tensioning pressing force acting in addition to the supporting force of the clamping element in the form of an overall pressing force and therefore increasing the maximum actuation force. As a result, a simple possibility is provided of configuring the overall pressing force which is composed of the supporting force of the clamping element and the tensioning pressing force.

The tensioning element is preferably configured as a spring element which applies the tensioning pressing force between the transmission element and the clamping element.

The spring element is preferably of closed configuration, in particular is configured as a ring, and is configured to apply the tensioning pressing force over the full circumference between the transmission element and the actuation element.

Here, the tensioning pressing force can be structurally designed simply, by, for example, a defined spring constant of the spring element being selected. In this way, a defined tensioning pressing force is to be expected in the case of an expansion to be expected of the tensioning element.

The end position is preferably defined by way of a stop which is of stationary configuration with respect to the transmission element and the actuation element.

The clamping element is preferably configured to bear against the stop in the end position of the actuation element, a force acting between the stop and the clamping element, which force counteracts the frictionally locking connection between the friction element and the counter-face.

A lifting geometry is preferably provided which is configured to space the friction element apart from the counter-face, or at least to release the frictionally locking connection between the friction element and the counter-face.

The lifting geometry is preferably provided in the end position, particularly preferably on the stop. The lifting geometry is preferably configured as a ramp, against which, for example, the clamping element or the friction element runs, as a result of which the spacing apart can take place.

The clamping element or the friction element is preferably also configured specifically to come into contact with the lifting geometry. For this purpose, a ramp is particularly preferably provided on the clamping element or on the friction element, which ramp is further preferably configured to run against the lifting geometry, preferably against the ramp of the lifting geometry.

The counter-face/counter-faces and/or the friction element are preferably configured with an increased coefficient of friction. As a result, a further increase of the maximum actuation force can be achieved if it has to be ensured that relatively high actuation forces have to be transmitted. Here, the coefficient of friction can preferably be increased by way of machining of the counter-face and/or the friction element. Thus, for example, grooves which run transversely with respect to the actuation direction or a surface of the counter-face and/or of the friction element which is of generally rougher design can be expedient.

The actuation element and the transmission element and/or the compensation mechanism are preferably configured such that, if a maximum actuation force is exceeded by way of the actuation force or by way of a force which is introduced into the transmission element, a relative movement takes place between the actuation element and the transmission element in the actuation direction. This ensures that the transmission element and the actuation element can be displaced with respect to one another, without transmitting introduced forces which are excessively high and might cause damage of the actuation mechanism or apparatuses which are in contact with the actuation mechanism.

Here, the maximum actuation force which can be transmitted at most by way of the frictionally locking connection between the actuation element and the transmission element is defined directly by the reinforcing pressing force. Here, the maximum actuation force is higher, the higher the reinforcing pressing force. Since the reinforcing pressing force is brought about from the actuation force substantially by way of the structural arrangement of the actuation element, the clamping element and the transmission element, a transmission ratio of the actuating force to the reinforcing pressing force is substantially possible by way of the structural design of said elements. Here, in particular, the connection between the actuation element and the clamping element is to be described in detail, which connection is preferably of bent configuration. Furthermore, the structural design of the friction element and the counter-face/counter-faces is decisive. Here, the magnitude of the reinforcing pressing force can be influenced, above all, by the angle, with which the contact faces of the friction element and the counter-face come into contact with one another, in particular when the counter-faces are a constituent part of a groove.

The actuation mechanism is preferably configured to decrease the reinforcing pressing force, preferably the overall pressing force, between the transmission element and the actuation element when the actuation element is situated in an end position, the decrease preferably taking place in such a way that, as a result, the maximum actuation force is decreased, and a relative movement between the actuation element and the transmission element is made possible in the actuation direction. The decrease of the overall pressing force can therefore also take place such that there is still a pressing force consisting of the reinforcing pressing force and the overall pressing force or only of the reinforcing pressing force between the transmission element and the actuation element. As a result, the maximum actuation force is decreased, as a result of which the relative movement between the actuation element and the transmission element takes place under the influence of a frictional force between the friction element and the counter-face/counter-faces. This can be appropriate for the compensation or adjustment movement if it is desired that a contact between the friction element and the counter-face/counter-faces continues to exist, in order to allow a reinforcing pressing force to act without delay in the case of the application of an actuation force.

The actuation mechanism is preferably configured to apply the actuation force to the actuation element pneumatically, hydraulically, mechanically, electrically and/or magnetically. In the case of a pneumatic or hydraulic application of the actuation force, the actuation element is preferably in contact with a piston/cylinder arrangement, or the actuation element is configured as a piston which closes a pressure space of a cylinder. As a result, the actuation element can be loaded with a pressure force as actuation force. In the case of an electrical or magnetic application, corresponding elements are provided which generate the actuation force from an electrical or magnetic field. To this end, for example, electric motors, in particular linear motors, are to be expected. Otherwise, a mechanical application is also possible, for example by way of a linkage which is in contact with the actuation element.

According to the invention, furthermore, a clutch actuator is provided which has an actuation mechanism, as described above, the clutch actuator being configured to disengage a clutch by way of the transmission element.

The actuation mechanism of the clutch actuator is preferably configured, when no actuation force acts on the actuation element, to release the relative movement between the actuation element and the transmission element. This advantageously ensures that the transmission element can compensate for wear of the clutch linings by way of the relative movement, when no actuation force acts on the actuation element. The transmission element can therefore remain constantly in contact with the clutch, in particular with a release bearing of the clutch, with the result that no idle travels can be produced as a result of the wear, which idle travels would initially have to be overcome in the case of the application of an actuation force to the actuation element.

The transmission element is preferably loaded in the actuation direction by way of an elastic prestressing force which is generated by way of a spring element, the elastic prestressing force being configured in such a way that, when no actuation force is applied to the actuation element, it is in equilibrium with an elastic prestressing force of a clutch spring. This achieves a situation where there is a continuous contact of the transmission element with the clutch, in particular with the release bearing.

The embodiments which have been described up to now can be combined with one another in any desired way, in order to obtain further embodiments which likewise have subjects which correspond to the subjects according to the invention. Therefore, in the following text, the description of preferred embodiments of the invention takes place with reference to the appended drawings.

DETAILED DESCRIPTION OF THE DRAWINGS

Figure 1:
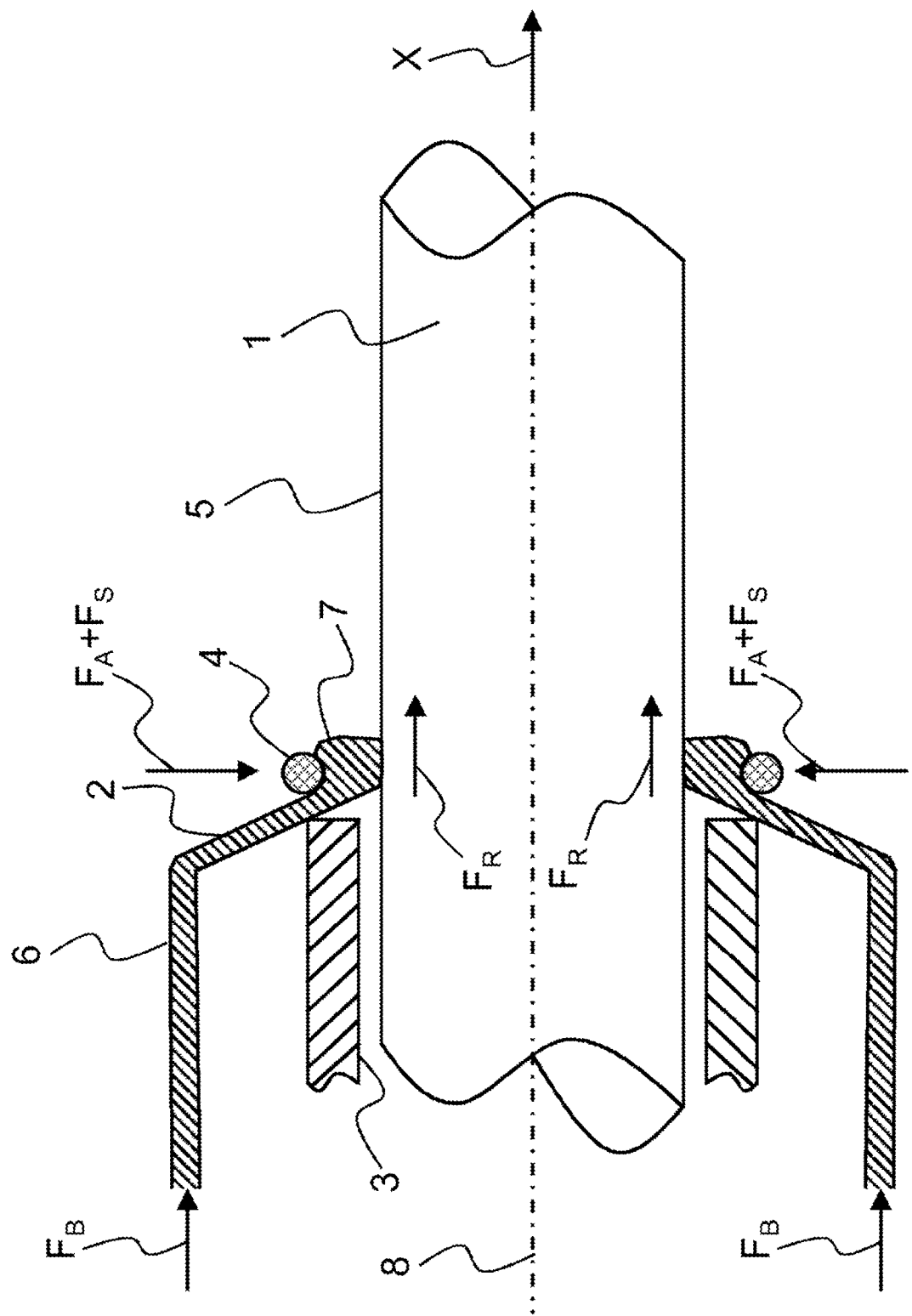
FIG. 1 is an outline sectional view of an actuation mechanism according to an embodiment of the invention.

FIG. 1 shows a sectional view of an actuation mechanism. Since the sectional view is symmetrical with respect to a horizontal axis, merely the upper elements of the actuation mechanism are described by way of designations. The lower elements correspond to the upper ones, with the result that designations are not necessary here.

An actuation mechanism is shown which has a transmission element 1 in the form of a cylindrical rod which extends from left to right in the illustration which is shown. The transmission element 1 has an axis 8 which is likewise oriented from left to right. Here, the transmission element 1 is configured such that it can be displaced in an actuation direction X along the axis 8.

Instead of a cylindrical transmission element 1, other cross-sectional shapes are also conceivable. Thus, for example, a square or rectangular cross-sectional shape is also conceivable.

Furthermore, an actuation element 6 is shown in section, which actuation element 6 extends around the transmission element 1 in a rotationally symmetrical manner about the axis 8 of the transmission element 1. Here, the actuation element 6 can be loaded with an actuation force $F_B$ which is shown on the left-hand side of the actuation element 6. On the right-hand side of the actuation element 6, the actuation element 6 merges into a clamping element 2. The clamping element 2 is configured in one piece with the actuation element 6 and is oriented so as to bend away with respect to the latter. As an alternative, the clamping element 2 can also be connected to the actuation element 6 via a joint which is provided, for example, in the bend between the actuation element 6 and the clamping element 2. This is a multiple-piece embodiment.

Starting from the actuation element 6, the clamping element 2 extends toward the transmission element 1. Here, however, its free end which is configured here as a clamping element receptacle 7 does not make contact with the surface 5 of the transmission element 1, contrary to the illustration in FIG. 1.

In the embodiment which is shown, further clamping elements 2 are arranged in a rotationally symmetrical manner about the axis 8 and are configured in one piece with the actuation element 6.

Figure 2:
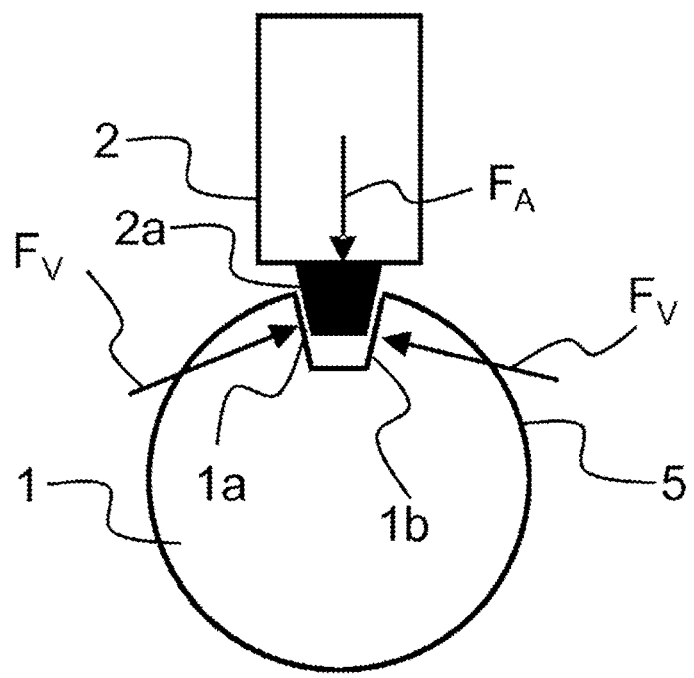
FIG. 2 is a detailed view of the connection between the clamping element and the transmission element.
Figure 3:
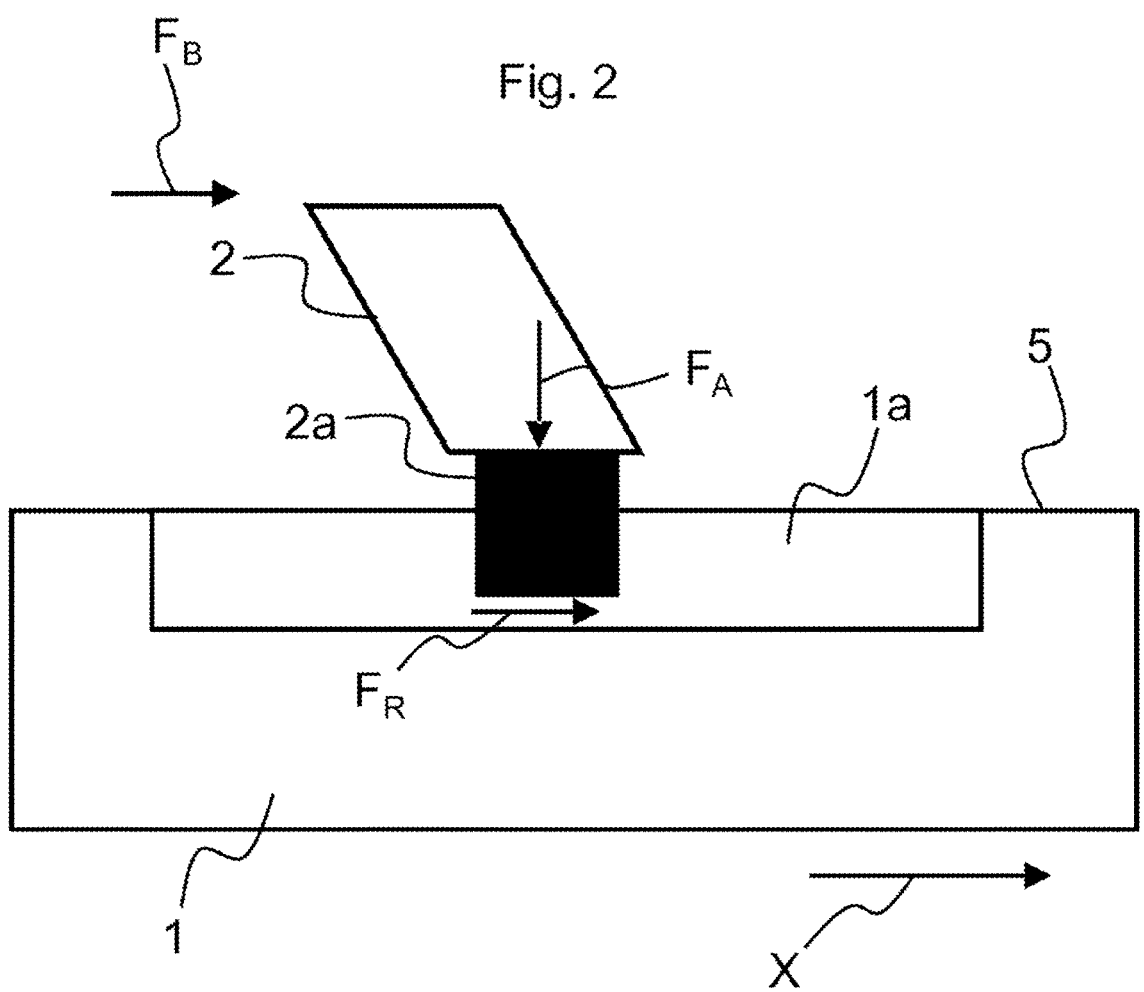
FIG. 3 is a further detailed view of the connection between the clamping element and the transmission element.

The description of the further construction of the actuation mechanism, in particular of the contact point between the clamping element 2 and the transmission element 1, takes place with consideration of FIG. 2 and FIG. 3. Therefore, reference is made in the following text to all the drawings. For reasons of clarity, FIG. 2 and FIG. 3 show merely the clamping element 2, which is shown at the top in FIG. 1, in an outline illustration. This construction of the contact point can be transferred to further clamping elements, as at the bottom in FIG. 1.

FIG. 2 shows the transmission element 1 and the clamping element 2 in the actuation direction X in section. FIG. 3 shows the same arrangement in section as FIG. 2, rotated by 90°.

The transmission element 1 has a groove which tapers from the surface 5 of the transmission element 1 into the transmission element 1 and has two counter-faces 1a, 1b in FIG. 2. The counter-faces 1a, 1b extend along the actuation direction X. Here, the counter-faces 1a, 1b are not oriented in parallel, but rather they configure a tapering cross section of the groove, the groove having the greatest opening at the surface 5 of the transmission element 1.

At its free end, the clamping element 2 has a friction element 2a in the form of a tongue. In a manner which corresponds to the counter-faces 1a, 1b of the groove, this is configured in such a way that it can be guided in the actuation direction X in the tapering groove.

Furthermore, FIG. 1 shows a stop 3 which is of stationary configuration with respect to the remaining elements, in particular the actuation element 6 and the transmission element 1. In the illustration which is shown and which corresponds to an end position of the actuation element 6, the clamping element 2 bears against the stop 3. As a result, the clamping element 2 is loaded with a reaction force which leads to the tensioning element receptacle 7 being bent away from the axis 8. This takes place by virtue of the fact that the reaction force is oriented parallel to an actuation direction X, a bending moment being produced about the connecting point between the actuation element 6 and the clamping element 2, which bending moment loads the clamping element 2 which is shown at the top in the illustration toward the left, and loads the clamping element 2 which is shown at the bottom toward the right.

The method of operation of the actuation mechanism which is shown is as described in the following text.

In the illustration which is shown in FIG. 1, the actuation mechanism, in particular the actuation element 6, is situated in an end position. In order then to achieve a displacement of the transmission element 1 in the actuation direction X by way of the actuation force $F_B$, the actuation force $F_B$ has to be transmitted to the transmission element 1. The transmission takes place between the friction element 2a and the counter-faces 1a, 1b, in particular, by way of a frictionally locking connection.

If an actuation force $F_B$ is applied to the actuation element 6, the clamping element 2 is released from the stop 3 as a result. The reaction force between the clamping element 2 and the stop 3 is canceled as a result, as a result of which the actuation force $F_B$ has to be supported by way of the clamping element 2 which is then free standing on the transmission element 1. The support takes place between the friction element 2a and the counter-faces 1a, 1b which come into contact with one another as a result or, if they are already in contact, are pressed onto one another in a more pronounced manner.

On account of the angled arrangement of the actuation element 6 and the clamping element 2, a high supporting force $F_A$ is produced as a result in the clamping element 2 for the support of the actuation force $F_B$. The supporting force $F_A$ is proportional to the applied actuation force $F_B$, and acts in a pressing manner between the friction element 2a and the counter-faces 1a, 1b. The ratio of the magnitudes of the actuation force $F_B$ and the supporting force $F_A$ can be specified here by way of the bend between the two elements.

Here, the supporting force $F_A$ can be absorbed in a merely frictionally locking manner between the friction element 2a and the counter-faces 1a, 1b. On account of the tapering configuration of the groove, a high reinforcing pressing force $F_V$ between the friction element 2a and the counter-faces 1a, 1b therefore results from the supporting force $F_A$ of the clamping element 2.

The reinforcing pressing force $F_V$ configures the frictionally locking connection for the transmission of the actuation force $F_B$ to the transmission element 1. As a result, a maximum actuation force which can be transmitted between the friction element 2a and the counter-faces 1a, 1b is also increased. Therefore, the generation of the reinforcing pressing force $F_V$ leads to it being possible for the displacement of the transmission element 1 in the actuation direction X to take place as soon as the resulting maximum actuation force is greater than or equal to the applied actuation force $F_B$.

The application of the actuation force $F_B$ to the actuation element 6 therefore brings about a frictional force $F_R$ between the friction element 2a and the counter-faces 1a, 1b, which frictional force $F_R$, if the actuation force $F_B$ is smaller than the maximum actuation force, corresponds to said actuation force $F_B$. As a consequence, the transmission element 1 experiences a displacement in the actuation direction X, which displacement arises from the actuation force $F_B$.

The connection which is shown between the friction element 2a and the counter-faces 1a, 1b nevertheless has a maximum actuation force, as a result of which an overload protection means is realized which, for example, permits slipping of the transmission element 1 with respect to the actuation element 6 if an excessive counter-force is introduced counter to the actuation direction X into the transmission element 1 and therefore into the actuation mechanism.

Moreover, the actuation mechanism which is shown has an automatic wear adjustment means which is active when the actuation element 6 is situated in the shown end position or when the clamping element 2 which is shown bears against the stop 3. To this end, the actuation element 6 or the clamping element 2 is loaded with a force counter to the actuation direction X, which force comes, for example, from a spring (not shown), with the result that the actuation element 6 and the clamping element 2 are pressed into the end position, as a result of which the reaction force between the stop 3 and the clamping element 2 is increased. As described above, the reaction force between the stop 3 and the clamping element 2 brings about that, as a result, a bending moment acts on the clamping element 2, which bending moment loads the clamping element 2 away from the axis 8. Here, the elements which are involved are configured in such a way that the bending moment acts counter to the reinforcing pressing force $F_V$. In this way, a maximum actuation force is reduced between the transmission element 1 and the actuation element 6, in particular between the friction element 2a and the counter-faces 1a, 1b, with the result that a displacement of the transmission element 1 with respect to the actuation element 6 can already be achieved by way of small forces which are introduced from the outside into the transmission element 1 counter to the actuation direction X.

A force of this type can be introduced into the transmission element 1 by way of a clutch spring, for example, the transmission element 1 being configured in this case to come into contact, for example, with a release bearing of the clutch, the clutch force being introduced via the release bearing into the transmission element 1.

If, for example, the clutch linings have pronounced wear, said wear has to be compensated for. This takes place by virtue of the fact that the clutch spring presses in a more pronounced manner on the transmission element 1. Since, in the end position which is shown, as described above, the maximum actuation force between the friction element 2a and the counter-faces 1a, 1b is greatly reduced, and in one preferred exemplary embodiment can preferably be reduced to zero, the transmission element 1 can then move freely with respect to the actuation element 6 and, as a result, can compensate for the clutch wear. In the case of the application of an actuation force $F_B$, the reinforcing pressing force $F_V$ and therefore the maximum actuation force between the friction element 2a and the counter-faces 1a, 1b are increased again. This takes place at the latest when the clamping element 2 is released from the stop 3. In preferred embodiments, however, this can also already take place at an earlier stage. Accordingly, the connection exists again between the friction element 2a and the counter-faces 1a, 1b, as a result of which the clutch can be disengaged by way of the actuation force $F_B$.

Moreover, the actuation mechanism can be configured to facilitate the release of the frictionally locking connection between the friction element 2a and the counter-faces 1a, 1b. For example, a run-up slope (not shown) can be provided, against which, for example, the clamping element 2 runs when it approaches the end position. By way of the run-up slope, the friction element 2a is lifted out of the groove or at least the reinforcing pressing force $F_V$ is reduced.

In addition, FIG. 1 shows an optional tensioning element 4 which is arranged on the tensioning element receptacle 7 of the clamping element 2. Here, the tensioning element receptacle 7 is correspondingly configured in order to receive the tensioning element 4. Here, the tensioning element 4 is configured as an annular spring element which extends in a rotationally symmetrical manner about the axis 8 of the transmission element 1. Here, the tensioning element 4 is configured in such a way that, in the illustration which is shown, it is widened away from the axis 8 by way of the tensioning element receptacle 7. As a consequence, the tensioning element 4 applies a tensioning pressing force $F_S$ from the outside on the tensioning element receptacle 7, as a result of which the friction element 2a is pressed into the groove and therefore into the counter-faces 1a, 1b.

As a result, the tensioning element 4 increases the active supporting force $F_A$ by the tensioning pressing force $F_S$. This can be calculated by way of interpretation of the spring constant of the tensioning element 4 and the widening to be expected on the contact section 7.

The tensioning element 4 therefore leads to it being possible for the reinforcing pressing force $F_V$ between the friction element 2a and the counter-faces 1a, 1b to be increased further, as a result of which the frictionally locking connection between the transmission element 1 and the clamping element 2 is reinforced, and the risk of slipping in the case of the application of an actuation force $F_B$ can be decreased.

Moreover, further tensioning elements 4 are conceivable which likewise make the application of a tensioning pressing force $F_S$ possible. For example, instead of a spring element, a clip can also be used which permits setting of the tensioning pressing force $F_S$, for example, by means of a screw.

Since the tensioning element 4 can be added optionally in order to improve the frictionally locking connection, embodiments are also conceivable which have neither a tensioning element 4 nor a tensioning element receptacle 7.

As described above, the actuation mechanism which is shown can preferably be used in a clutch actuator. Here, the principle of the transmission of the actuation force $F_B$ from the actuation element 6 to the transmission element 1 can be applied both for centrally arranged and for decentrally arranged clutch actuators. A centrally arranged clutch actuator is, for example, arranged with respect to a clutch in such a way that the displacement of the transmission element 1 in the actuation direction X takes place in a centrally aligned manner with the release bearing of the clutch. The displacement in order to disengage the clutch takes place here directly by way of the transmission element 1. In the case of a decentral clutch actuator, the transmission element 1 is not arranged in the actuation direction X in a centrally aligned manner with the release bearing. Here, the displacement for disengaging the clutch takes place indirectly, for example by way of a transmitting linkage. Furthermore, in the case of a centrally arranged clutch actuator, a shaft which is connected to one clutch side can be guided through the clutch actuator. For example, the axis of said shaft then corresponds to the axis 8 of the transmission element 1, the transmission element 1 being of hollow configuration and the shaft penetrating the transmission element 1. These and other overall designs of clutch actuators do not restrict the subject matter of the invention, however.

LIST OF DESIGNATIONS

1 Transmission element
1a Counter-face
1b Counter-face
2 Clamping element
2a Friction element
3 Stop
4 Tensioning element
5 Surface, transmission element
6 Actuation element
7 Tensioning element receptacle
8 Axis
FA Supporting force
FB Actuation force
FR Frictional force
FS Tensioning pressing force
FV Reinforcing pressing force
X Actuation direction

What is claimed is:
1. An actuation mechanism for a clutch, comprising:
an actuation element configured to be loaded with an actuation force and to be displaced by way of the actuation force in an actuation direction;
a transmission element configured to carry out a displacement in the actuation direction; and
a compensation mechanism configured to apply a reinforcing pressing force for a frictionally locking transmission of the actuation force between the transmission element and the actuation element when the actuation force is applied to the actuation element, wherein
the compensation mechanism comprises a friction element and a counter-face which are configured to bring about the reinforcing pressing force via a frictionally locking connection when the actuation force is applied,
the friction element and the counter-face are configured to bring about the reinforcing pressing force by way of a supporting force resulting from a deflection of the actuation force,
the reinforcing pressing force has at least the magnitude of the supporting force,
the counter-face is configured as a face of a groove which extends along the actuation direction, and the friction element is configured as a tongue which is configured to be guided in the groove along the actuation direction.

2. The actuation mechanism as claimed in claim 1, wherein at least one of:
  (i) the compensation mechanism is configured to reduce the reinforcing pressing force between the transmission element and the actuation element when no actuation force is applied to the actuation element, and/or when the actuation element is situated in an end position, or
  (ii) the friction element and the counter-face are configured to permit a relative movement of the transmission element with respect to the actuation element parallel to the actuation direction when no actuation force is applied to the actuation element and/or when the actuation element is situated in the end position.

3. The actuation mechanism as claimed in claim 2, wherein
  the compensation mechanism comprises a clamping element configured for deflecting the actuation force into the supporting force,
  the magnitude of the supporting force proportionally to the magnitude of the actuation force is higher, and/or
  the compensation mechanism is configured to reduce the reinforcing pressing force to zero.

4. The actuation mechanism as claimed in claim 3, wherein
  the clamping element is configured in one piece with the actuation element, or is connected to the actuation element via a torque-free articulated connection.

5. The actuation mechanism as claimed in claim 3, wherein
  the friction element is provided on the actuation element or the clamping element, and the counter-face is provided on the transmission element, or
  the friction element is provided on the transmission element, and the counter-face is provided on the actuation element or the clamping element.

6. The actuation mechanism as claimed in claim 3, wherein
  the end position is defined by way of a stop which is of stationary configuration with respect to the transmission element and the actuation element.

7. The actuation mechanism as claimed in claim 6, wherein
  the clamping element is configured to bear against the stop in the end position of the actuation element, and
  a force acting between the stop and the clamping element counteracts the frictionally locking connection between the friction element and the counter-face.

8. The actuation mechanism as claimed in claim 6, wherein
  a lifting geometry is provided in the end position on the stop, which lifting geometry is configured to space the friction element apart from the counter-face, or at least to release the frictionally locking connection between the friction element and the counter-face.

9. The actuation mechanism as claimed in claim 1, wherein
  the groove is configured as a groove which tapers transversely with respect to the actuation direction, wherein the counter-face and a further counter-face which extends along the actuation direction form the tapered portion.

10. The actuation mechanism as claimed in claim 1, further comprising:
  a tensioning element between the actuation element and the transmission element, which tensioning element is configured to generate a tensioning pressing force which is configured so as to improve the frictionally locking transmission of the actuation force.

11. The actuation mechanism as claimed in claim 10, wherein
  the tensioning element is configured as a spring which generates the tensioning pressing force, and
  the spring has a closed configuration as a ring, and is configured to apply the tensioning pressing force over a full circumference between the transmission element and the actuation element.

12. The actuation mechanism as claimed in claim 1, wherein
  the actuation mechanism is configured to apply the actuation force to the actuation element pneumatically, hydraulically, mechanically, electrically and/or magnetically.

13. A clutch actuator, comprising:
  an actuation mechanism as claimed in claim 1, wherein the clutch actuator is configured to disengage a clutch by way of the transmission element.

14. The clutch actuator as claimed in claim 13, wherein
  the actuation mechanism is configured, when no actuation force acts on the actuation element, to permit a relative movement between the actuation element and the transmission element, and/or
  the transmission element is loaded in the actuation direction by way of an elastic prestressing force which is generated by way of a spring element, wherein the elastic prestressing force is configured such that, when no actuation force is applied to the actuation element, it is in equilibrium with an elastic prestressing force of a clutch spring.

15. An actuation mechanism for a clutch, comprising:
  an actuation element configured to be loaded with an actuation force and to be displaced by way of the actuation force in an actuation direction;
  a transmission element configured to carry out a displacement in the actuation direction;
  a compensation mechanism configured to apply a reinforcing pressing force for a frictionally locking transmission of the actuation force between the transmission element and the actuation element when the actuation force is applied to the actuation element, wherein
    the compensation mechanism comprises a friction element and a counter-face which are configured to bring about the reinforcing pressing force via a frictionally locking connection when the actuation force is applied,
    the friction element and the counter-face are configured to bring about the reinforcing pressing force by way of a supporting force resulting from a deflection of the actuation force,
    the reinforcing pressing force has at least the magnitude of the supporting force; and
  a tensioning element between the actuation element and the transmission element, which tensioning element is configured to generate a tensioning pressing force which is configured so as to improve the frictionally locking transmission of the actuation force.

16. The actuation mechanism as claimed in claim 15, wherein
  the tensioning element is configured as a spring which generates the tensioning pressing force, and the spring has a closed configuration as a ring, and is
configured to apply the tensioning pressing force over
a full circumference between the transmission element
and the actuation element.

\* \* \* \* \*